(12) United States Patent
Dicks et al.

(10) Patent No.: US 8,276,793 B2
(45) Date of Patent: Oct. 2, 2012

(54) FITMENT FOR FLEXIBLE CONTAINER

(75) Inventors: David H. Dicks, Glocester, RI (US); Anand P. Panchu, Newton, MA (US); John C. Balsavich, Jr., Foxborough, MA (US); Jonas S. Campos, Malden, MA (US); Jeffrey C. Chien, Wellesley, MA (US)

(73) Assignee: Nova Biomedical Corporation, Waltham, MA (US)

( * ) Notice: Subject to any disclaimer, the term of this patent is extended or adjusted under 35 U.S.C. 154(b) by 2295 days.

(21) Appl. No.: 10/756,544

(22) Filed: Jan. 12, 2004

(65) Prior Publication Data

US 2005/0150917 A1    Jul. 14, 2005

(51) Int. Cl.
    B65D 5/72    (2006.01)
(52) U.S. Cl. ..................... 222/566; 222/107
(58) Field of Classification Search ............ 222/566, 222/567, 569, 105, 107; 383/80, 906
    See application file for complete search history.

(56) References Cited

U.S. PATENT DOCUMENTS

| | | | |
|---|---|---|---|
| 4,353,488 A | 10/1982 | Schneiter et al. | |
| 4,362,255 A | 12/1982 | Bond | |
| 4,695,337 A | 9/1987 | Christine | |
| 4,775,523 A * | 10/1988 | Sparacio et al. | 424/49 |
| 4,883,192 A * | 11/1989 | Krugman | 220/711 |
| 5,087,235 A | 2/1992 | Lafleur | |
| 5,160,308 A | 11/1992 | Peppiatt | |
| 5,170,910 A | 12/1992 | Hamm | |
| 5,324,233 A | 6/1994 | Owensby et al. | |
| 5,334,180 A | 8/1994 | Adolf et al. | |
| 5,348,525 A | 9/1994 | Buchanan | |
| 5,484,375 A | 1/1996 | Owensby et al. | |
| 5,514,123 A | 5/1996 | Adolf et al. | |
| 5,788,120 A | 8/1998 | Stumler | |
| 5,855,544 A | 1/1999 | Buchanan | |
| 6,050,451 A | 4/2000 | Hess, III et al. | |
| 6,053,360 A | 4/2000 | Rutter | |
| 6,082,584 A * | 7/2000 | Stern | 222/83 |
| 6,129,228 A | 10/2000 | Adams et al. | |
| 6,142,341 A | 11/2000 | Uematsu | |
| 6,176,394 B1 | 1/2001 | Shimko et al. | |
| 6,227,410 B1 * | 5/2001 | Stern | 222/1 |
| 6,273,307 B1 | 8/2001 | Gross et al. | |
| 6,302,300 B1 | 10/2001 | Bosch | |
| 6,378,731 B1 | 4/2002 | Klabes | |
| 6,439,429 B1 | 8/2002 | Gross | |

(Continued)

FOREIGN PATENT DOCUMENTS

DE    36 35 857 A1    5/1988

(Continued)

*Primary Examiner* — Kevin P Shaver
*Assistant Examiner* — Donnell Long
(74) *Attorney, Agent, or Firm* — Robert R. Deleault, Esq.; Mesmer & Deleault, PLLC

(57) ABSTRACT

A fitment for use with a flexible container having a lower fitment member with a fluid conducting opening in a top surface and an upper fitment member with an upper fitment opening in an upper fitment bottom surface where the fluid conducting opening and the upper fitment opening form a fluid passageway or conduit. A wall of the flexible container is compressibly held between the top surface of the lower fitment member and the upper fitment bottom surface. The fitment may also include one or more additional walls of one or more additional flexible containers forming a bag-in-a-bag structure.

24 Claims, 3 Drawing Sheets

U.S. PATENT DOCUMENTS

| | | |
|---|---|---|
| 6,460,732 B1 | 10/2002 | Drennow |
| 6,607,097 B2 | 8/2003 | Savage et al. |
| 6,805,261 B1 * | 10/2004 | Laudenberg .................. 222/107 |
| 2001/0009258 A1 | 7/2001 | Wakayama |
| 2002/0148857 A1 | 10/2002 | Savage et al. |
| 2003/0009126 A1 | 1/2003 | Zollinger et al. |
| 2003/0075560 A1 | 4/2003 | Lee |
| 2003/0123760 A1 | 7/2003 | Olin |

FOREIGN PATENT DOCUMENTS

| | | |
|---|---|---|
| DE | 40 23 274 A1 | 1/1992 |
| EP | 0 414 992 B1 | 12/1992 |
| EP | 0 198 843 B2 | 4/1995 |
| EP | 0 905 045 A2 | 3/1999 |
| FR | 1087930 | 3/1955 |
| GB | 1104359 | 2/1968 |
| WO | WO 02/14169 A1 | 2/2002 |

* cited by examiner

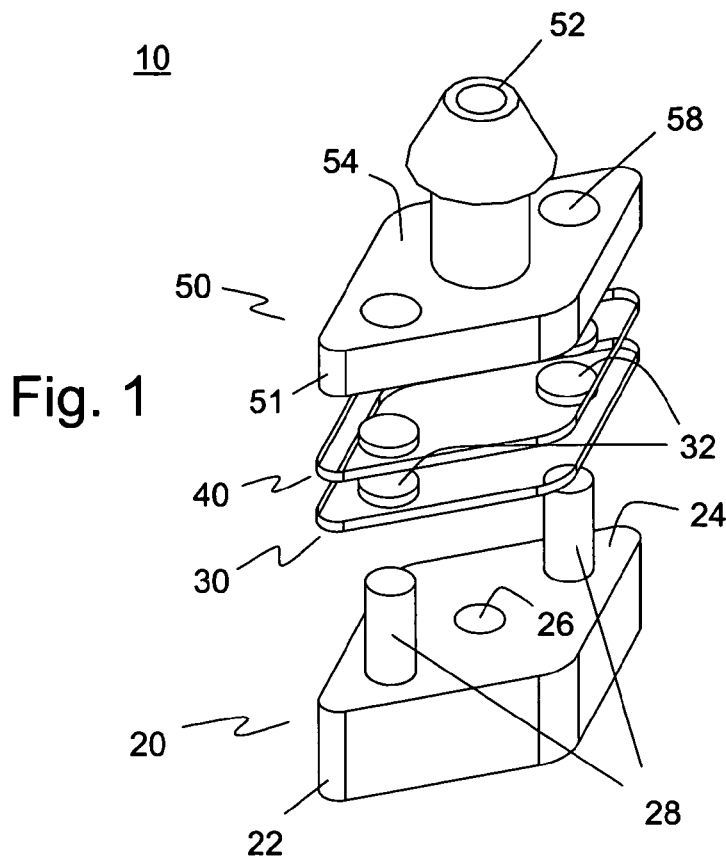
Fig. 1
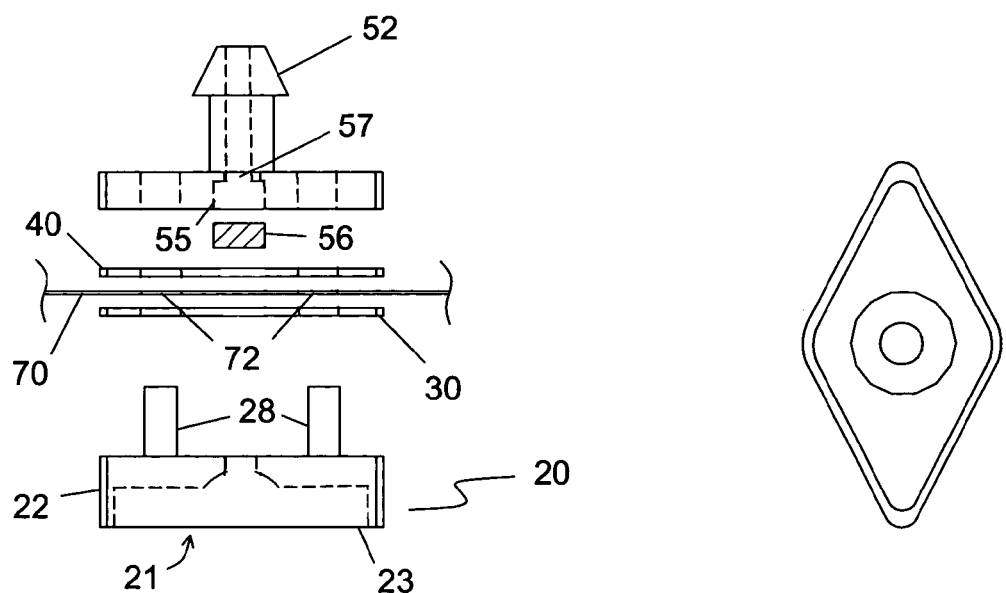
Fig. 2
Fig. 2a

FITMENT FOR FLEXIBLE CONTAINER

BACKGROUND OF THE INVENTION

1. Field of the Invention

The present invention relates generally to flexible containers. Particularly, the present invention relates to fitments for sealed, flexible containers. More particularly, the present invention relates to a sealing method for a fitment to a single or multi-layered flexible container intended for long term oxygen stability.

2. Description of the Prior Art

Pouch-type flexible containers have been used for sterile packaging of various foodstuffs, liquids and other degradable material. These flexible containers are typically made from webs of flexible film that are folded and sealed together along the unconnected peripheral sides. A few medical solutions have been sterilely packaged in pouch-type flexible containers as well as solutions used to insure proper performance of various chemical analyzers.

For example, to insure proper performance of Blood Gas Analyzers, control material is typically run several times per day. This material consists of solutions that have been tonometered to specific values of dissolved oxygen and carbon dioxide concentrations along with specific pH values and electrolyte and metabolic concentrations. For external control samples, the current state of the art is to store the control material in glass ampules. In order to run these controls the operator must break the ampules and manually introduce the samples into the analyzer, typically at predetermined time intervals, three levels of control per shift, three times per day. This approach is time consuming and requires user intervention.

A recent trend in the industry is to automate this process by storing the control material on board the analyzer and automatically running the required controls at preset time intervals. This greatly reduces the amount of time required by the operator. One approach for storing the control material on board the analyzer is to package it in flexible containers such as pouches and docking these pouches to the analyzer. A disadvantage with this approach is that, typically, the pouch material is not as good of a barrier to gas transport as are the glass ampules used for external controls. Examples of various concerns with use of a flexible container are an increase in oxygen of the control material due to oxygen diffusion through the flexible container material, a reduction in oxygen concentration due to a chemical reaction between the control fluid and the flexible container material, etc.

The majority of flexible films used for flexible containers are monolayer PVC films. Recently, a few multiple-layer, extrusion or adhesive laminated films have been developed. These multiple-layer films typically have an inner, solution contacting film layer and an outer barrier layer that can be made of aluminum foil or some other barrier material. The inner, solution contacting layer must be substantially inert to the solution while the outer barrier layer must be durable and also compatible with other materials that may contact or be attached to the outside surface. The flexible container or pouch is formed from flat, film material by heat sealing the edges together and thereby melting the inner plastic layer. These pouches typically require a fitment for accessing the contents of the pouch. For use in blood gas and chemistry analyzers, the pouches require a fitment that docks the pouch to the analyzer and makes the fluid connection. Currently, the fitment is placed at the periphery of the bag between two layers of the bag and the fitment and the inner plastic layer of the flexible container or bag are melted to each other. This requires that the fitment material and the bag material have similar melting points. This limitation requires that the fitment is typically made of a low melting point plastic, such as polyethylene. A primary disadvantage of the fitment material is that the fitment material typically has a higher oxygen permeability than the film material. In other words, the fitment is a "hole" in the sealed bag. The permeability characteristic of the fitment material is much poorer than the similar characteristic for the laminated film used to make the flexible container. Thus, the fitment is often the weakest part of the barrier characteristics of the flexible container. Another disadvantage is that the heat sealing process tends to damage the barrier layer, which can lead to inconsistent performance.

U.S. Pat. No. 5,514,123 (1996, Adolf et al.) discloses a sterile formed, filled and sealed flexible solution container and a sterile administration port assembly which is attached without interrupting the complete sealing of the hermetically sealed fluid container and which allows for the sterile packaging, storage and delivery of a sterile medical solution without heat degradation or oxygen permeation. Particularly, the flexible container is thermally fused to the saddle flange of the administration port assembly.

U.S. Pat. No. 6,142,341 (2000, Uematsu) discloses a spout assembly comprising a spout and a cap. The spout has a cylindrical outer tube to be placed outside a package and a base to be bonded to the inner surface of the package. The cap is separably connected to an extremity of the cylindrical outer tube coaxially with the cylindrical outer tube in a position in which the cap is pushed into the cylindrical outer tube.

U.S. Pat. No. 6,378,731 (2002, Klabes) discloses a pouring spout for a bag, which comprises a spout, which is inserted into a bag opening. The spout is detachably held in the bag opening by a clamping means, such that it is sealed opposite the bag wall.

A disadvantage of the prior art is that fitment attachment requires heat sealing of the fitment to the flexible film material at the periphery of the container. This limits the available material that can be used for the fitment to a low melting point plastic. These materials have relatively high oxygen permeability properties. Another disadvantage is the damage induced to the barrier layer during the heat sealing process to the fitment. A further disadvantage of a mechanical clamping seal of certain prior art is that the clamping mechanism and spout must be connected to the flexible material along the periphery of the pouch.

Therefore, what is needed is a fitment that is made of a low oxygen permeable material for use with flexible containers. What is further needed is a fitment that reduces the damage to the barrier layer of the flexible container when attached. What is also needed is a fitment and flexible container capable of preserving the contents of the flexible container for a longer period of time.

SUMMARY OF THE INVENTION

It is an object of the present invention to provide a fitment for use with a flexible container that limits the damage to the barrier layer of the flexible container. It is another object of the present invention to provide a fitment for use with a flexible container that has low gas permeability properties. It is a further object of the present invention to provide a fitment for use with a flexible container that does not require attachment along the sealed periphery of the flexible container. It is yet another object of the present invention to provide a fitment for use with a multi-layered, flexible container that increases the shelf life of the contents of the flexible container.

The present invention achieves these and other objectives by providing a fitment attached to a flexible container using by a mechanical sealing method. The fitment includes at least a lower fitment member and an upper fitment member. Optionally, the fitment may include at least one gasket, but preferably includes a lower fitment gasket and an upper fitment gasket. The lower fitment member includes a lower fitment body having a top surface and a fluid conducting opening. Lower fitment member may optionally include one or more posts extending from the top surface of the lower fitment body. The optional lower fitment gasket is configured with the top surface of the lower fitment member. Where the optional posts are included on the lower fitment member, one or more openings may also be optionally provided in lower fitment gasket and positioned to align with the one or more posts.

The optional upper fitment gasket is similar to the lower fitment gasket and may also be optionally configured with one or more openings positioned to align with the one or more posts of the lower fitment member. The upper fitment member includes an upper fitment body having an upper member fluid conducting opening in a top surface, preferably a tubular member extending from the top surface and axially aligned with said upper member fluid conducting opening. When the upper fitment member is assembled to the lower fitment member, the upper fitment fluid conducting opening is aligned with the lower fitment fluid conducting opening forming a fluid passageway. The fluid passageway may optionally and preferably include a septum. Where the optional posts are included on the lower fitment member, at least an equal number of post receiving apertures are incorporated into the upper fitment member where the post receiving apertures are positioned to align with the one or more posts of the lower fitment member.

The lower fitment member optionally includes a recess in the bottom of the lower fitment body. The fluid conducting opening through the lower fitment member is preferably centrally located to align with the upper fitment fluid opening of the upper fitment member.

The fitment is attached to a flexible film used to make a flexible container/pouch/bag at a position along the film's surface. The position selected preferably includes one or more holes (the number of holes are preferably equal to the number of posts on lower fitment member) through the film that align with the one or more posts of the lower fitment member. To assemble the fitment of the present invention, an optional lower fitment gasket is attached to the lower fitment member. The flexible film with optional holes is positioned up against the optional lower fitment gasket, or if no gasket is used, up against the top surface of the lower fitment member. An optional upper fitment gasket is positioned against the flexible film opposite the top surface of the lower fitment member, or if no gasket is used, the upper fitment bottom surface is positioned against the flexible film. Upper fitment member preferably has a septum in axial alignment with the upper fitment fluid opening. With the lower fitment member in a fixed position, upper fitment member is subjected to a downward force compressing the optional gaskets and the flexible film forming a fluid tight seal. During compression, the lower fitment member is fused to the upper fitment member using any sealing means known to one of ordinary skill in the art such as, for example, heat staking, etc. Where a lower fitment member having one or more posts is used, the posts are fused to the upper fitment member.

In an embodiment to enhance the shelf life of the contents of the flexible container, a second or third or more layers of flexible material are used to form bags-within-a-bag. In this embodiment, an additional optional gasket for each additional layer is preferably used to insure a fluid tight seal. Effectively, this embodiment may be considered as a container-within-a-container or a bag-within-a-bag structure. Between the containers is a quantity of fluid or control material that is similar to the fluid or material to be placed within the flexible container for later use. For example, when the present invention is used with blood gas analyzers, the volume between the inner container and the outer container can either be filled with the same liquid (tonometered to the same gas concentrations) or a gas with similar oxygen and carbon dioxide concentrations. The inner bag is filled with the control material that will be used by the analyzer.

BRIEF DESCRIPTION OF THE DRAWINGS

FIG. 1 is a perspective view of one embodiment of the present invention showing the individual components in alignment.

FIG. 2 is a front view of the embodiment in FIG. 1 showing the placement of the flexible film of the container.

FIG. 2a is a bottom view of the lower fitment member of the present invention.

DETAILED DESCRIPTION OF THE PREFERRED EMBODIMENT

Figure 3:
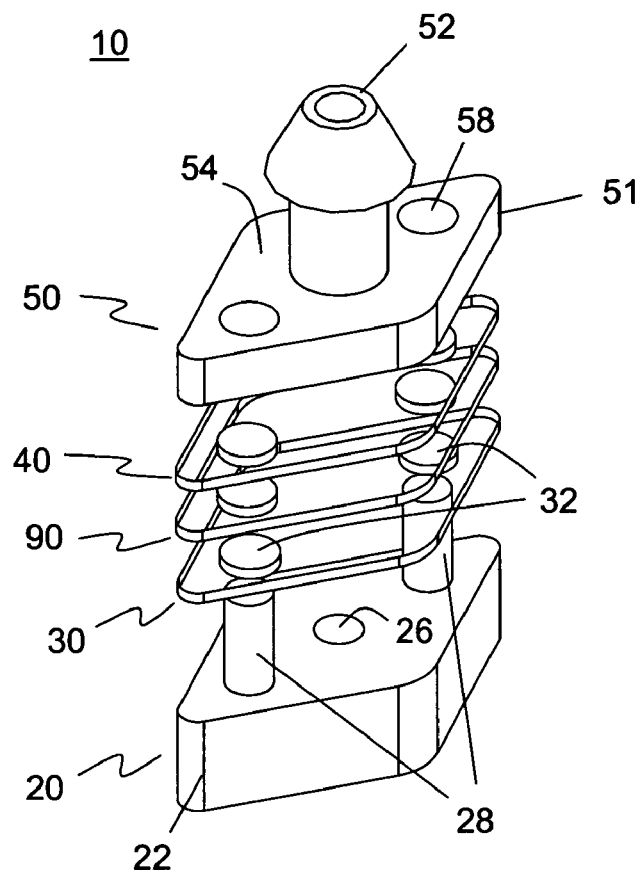
FIG. 3 is a perspective view of another embodiment of the present invention showing the individual components in alignment when multiple layers of flexible film is used.

The preferred embodiment(s) of the present invention are illustrated in FIGS. 1-5. FIG. 1 illustrates a perspective view of a fitment 10 of the present invention. Fitment 10 includes at least a lower fitment member 20, a lower fitment gasket 30, an upper fitment gasket 40, and an upper fitment member 50. The lower fitment member 20 includes a lower fitment body 22 having a top surface 24, a fluid conducting opening 26 and one or more posts 28 extending from the top surface 24 of lower fitment body 22. The lower fitment gasket 30 is configured with openings 32 positioned to align with the posts 28 and the top surface 24 of the lower fitment member 20. The upper fitment gasket 40 is similar to lower fitment gasket 30 and is also configured with openings 42 positioned to align with the posts 28 of the lower fitment member 20. The upper fitment member 50 includes an upper fitment body 51 having an upper fitment bottom surface 53 (not shown), an upper fitment fluid conducting opening or fluid conduit (not shown) in a top surface 54 with preferably a tubular member 52 extending from top surface 54 and post receiving apertures 58 positioned to align with the posts 28 of the lower fitment member 20. Septum 56 (not shown) is seated within the upper fitment body 51 and axially aligned with the tubular member 52.

Turning now to FIG. 2, there is illustrated a front view of the embodiment in FIG. 1 with a partial segment of a flexible container material. FIG. 2 shows a flexible container material 70 positioned between lower fitment gasket 30 and upper fitment gasket 40. Fitment gaskets 30 and 40 are incorporated to prevent leakage around posts 28. Flexible container material 70 preferably includes through holes 72 spatially positioned to align with the posts 28 of lower fitment member 20. Lower fitment body 22 preferably has a recess 21 (as indicated by the dashed lines and as more clearly shown in FIG. 2a) in the bottom 23. Recess 21 minimizes the possibility that, as the contents of the flexible container deplete, the flexible material collapses against the exit port and blocks the port preventing the contents from being withdrawn. Septum 56 is positioned within septum recess 55 in upper fitment body 51 in axial alignment with upper fitment fluid opening 57. It is important to note that the fitment is mechanically sealed to the flexible container material using compression and then heat staking the posts 28 of lower fitment member 20 to upper fitment member 50 while under compression. Because the flexible container material 70 is not heat sealed to the fitment 10, a low gas permeable material can be used for fitment 10. In the present invention, fitment 10 is preferably made of an acrylonitrile methyl acrylate copolymer available under the trademark Barexe ® 210 from Barex Resins, Naperville, Ill.

Flexible container material 70 is a flexible film preferably having low gas permeability but is also capable of fusing to itself to create a bag or pouch. This type of flexible film is typically a multi-layered plastic material that includes a barrier layer that is made of aluminum foil or some other barrier material. For the present invention, the flexible film is preferably a barrier film such as, for example, a heavy duty barrier packaging available from PacTech, a division of HAL Baggin, Inc., Rochester, N.Y., or a product sold under the trademark Escalt™ made by Mitsubishi. Escalt™ barrier film is a polypropylene. The barrier layer is a vacuum-deposited ceramic on a PVA substrate and the inner sealing layer is polyethylene.

Turning now to FIG. 3, there is illustrated another embodiment of the present invention showing the components for a bag-in-a-bag system. For simplicity and clarity, like components are similarly numbered as those illustrated in FIGS. 1 and 2. In this embodiment, fitment 10 includes at least a lower fitment member 20, a lower fitment gasket 30, a middle gasket 90, an upper fitment gasket 40, and an upper fitment member 50. The structural features of this embodiment are the same as the embodiment shown in FIG. 1 except that an additional middle gasket 90 is included to be positioned between adjacent layers of flexible film material. In fact any number of layers may be used by adding an additional gasket between each film layer. It should be understood by those skilled in the art that an adjustment may be made in the length of posts 28 of lower fitment member 20 in order to accommodate the additional layers and gaskets intended to be used.

Figure 4:
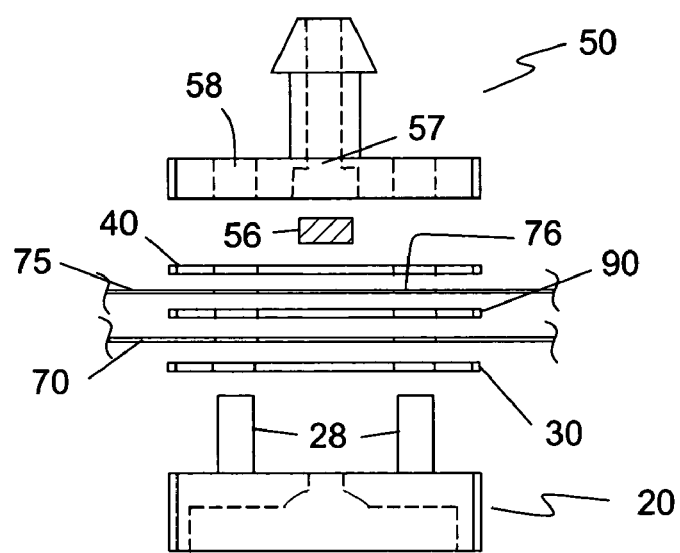
FIG. 4 is a front view of the embodiment in FIG. 3 showing placement of two layers of flexible film of the container within a container.

FIG. 4 illustrates a front view of the embodiment in FIG. 3 with a partial segment of a first and second flexible container material. Flexible container material 70 is positioned between lower fitment gasket 30 and middle gasket 90. Flexible container material 75 is positioned between middle gasket 90 and upper fitment gasket 40. Fitment gaskets 30, 40 and 90 are incorporated to prevent leakage around posts 28. Flexible container material 75, like material 70, preferably includes through holes 76 spatially positioned to align with the posts 28 of lower fitment member 20.

Figure 5:
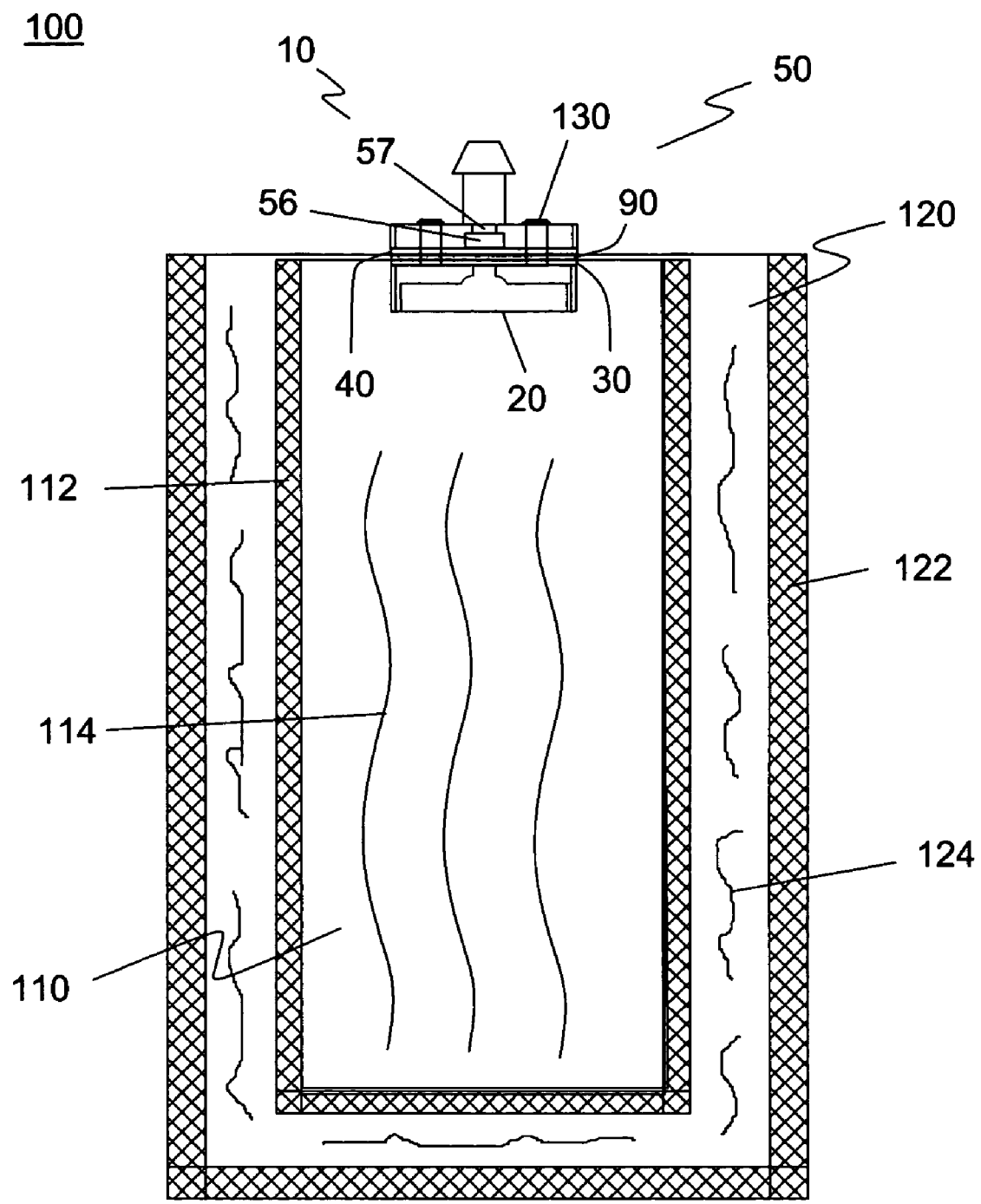
FIG. 5 is a front view of a combination of a fitment and a double container.

Turning now to FIG. 5, there is illustrated the combination of fitment 10 with a bag-within-a-bag container forming a filled and hermetically-sealed container system 100. Container system 100 includes a first bag container 110 sealed along its periphery 112 and filled with a material 114, a second bag container 120 sealed along its periphery 122 and filled with a quantity of material 124 that is similar to material 114, and a fitment 10 attached through the surfaces of first bag container 110 and second bag container 120. In a blood-gas analyzer, for example, material 114 is a tonometered fluid and material 124 may be the same tonometered fluid or a gas with similar oxygen and carbon dioxide concentrations as that contained within the tonometered fluid 114.

Fitment 10 is assembled to flexible container material 70 as previously described and shown. Once the individual components (lower fitment member 20, lower fitment gasket 30, material 70, upper fitment gasket 40, and upper fitment member 50 with septum 56 installed) are assembled, the fitment 10 and material 70 are sealed by mechanically compressing upper fitment member 50 to lower fitment member 20. A pneumatic cylinder is preferably used to compress the gaskets 30 and 40 and the material 70 making a fluid tight seal. While under compression, posts 28 of lower fitment member 20 are fused to upper fitment member 50 (as shown by reference numeral 130 in FIG. 5). Although the preferred method uses heat to stake the posts 28 to upper fitment member 50, ultrasonic or other sealing methods can also be used, all as is generally known to those skilled in the art.

Where a multiple bag system is assembled, additional gaskets are placed between layers of flexible film material and the same sealing process is performed. Once fitment 10 is attached to one or more flexible film materials, the flexible films are folded onto themselves and a peripheral seal is made along two of the three sides. The nearly complete bag or pouch is then filled with the intended solution or material and then the third and last side is peripherally sealed. In a double bag system, the inner bag is filled and sealed first, followed by the filling and sealing of the outer bag.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. In combination, a fitment and a flexible container comprising:
    a lower fitment member having a top surface with a fluid conducting opening;
    a wall of said flexible container disposed onto said top surface of said lower fitment member; and
    an upper fitment member having an upper fitment top surface, an upper fitment bottom surface and an upper fitment conduit aligned with said fluid conducting opening and disposed onto said top surface of said lower fitment member forming a fitment, said fitment being attached to said wall of said flexible container by mechanical compression wherein said wall of said flexible container disposed between said fluid conducting opening of said lower fitment member and said upper fitment conduit of said upper fitment member remains intact and wherein said wall of said flexible container disposed between outermost perimeter edges of each of said lower fitment member and said upper fitment member remains planar.

2. The combination of claim 1 wherein said upper fitment member further includes a septum having a thickness substantially greater than the thickness of the wall of the flexible container, the septum seated within the upper fitment member in axial alignment with said upper fitment conduit.

3. The combination of claim 2 wherein said septum is made of a resilient material.

4. The combination of claim 1 wherein top surface of said lower fitment member and said bottom surface of said upper fitment member have a layer of resilient material disposed thereon.

5. The combination of claim 1 wherein said fitment further comprising at least a fitment gasket positioned between said top surface of said lower fitment member and said bottom surface of said upper fitment member.

6. The combination of claim 1 wherein said upper fitment member includes an elongated tube extending from said upper fitment top surface and axially aligned with said upper fitment conduit.

7. The combination of claim 1 wherein said lower fitment member includes one or more posts extending from said top surface through said wall of said flexible container and wherein said upper fitment member includes at least an equal number of post receiving openings.

8. The combination of claim 7 wherein said upper fitment member is fused to said one or more posts of said lower fitment member.

9. The combination of claim 1 wherein said lower fitment member and said upper fitment member are made of a material having low gas permeability.

10. The combination of claim 9 wherein said material is an acrylonitrile methyl acrylate copolymer.

11. A method of providing an improved flexible bag and fitment combination, said method comprising:
    obtaining a fitment having a lower fitment member with a top surface and a fluid conducting opening in said top surface, an upper fitment member having an upper fitment bottom surface with an upper fitment fluid opening;
    positioning said top surface of said lower fitment member on one side of a wall of said flexible container;
    positioning said upper fitment bottom surface of said upper fitment member on the opposite side of said wall and opposed to said lower fitment member wherein said upper fitment fluid opening is axially aligned with said fluid conducting opening of said lower fitment member;
    compressing said lower fitment member and said upper fitment member together;
    and securing said lower fitment member and said upper fitment member together forming a fluid tight seal with said flexible container wherein said wall of said flexible container disposed between said fluid conducting opening of said lower fitment member and said upper fitment fluid opening of said upper fitment member remains intact and wherein said wall of said flexible container disposed between outermost perimeter edges of each of said lower fitment member and said upper fitment member remains planar.

12. The method of claim 11 further comprising coating at least one of said top surface and said upper fitment bottom surface with a resilient material.

13. The method of claim 11 further comprising inserting at least one gasket between said top surface and said upper fitment bottom surface.

14. The method of claim 11 wherein said obtaining step includes obtaining a fitment having a lower fitment member with one or more posts extending from said top surface through said wall of said flexible container and an upper fitment member with at least an equal number of post receiving openings configured to mate with said one or more posts.

15. The method of claim 14 further comprising fusing said one or more posts to said upper fitment member.

16. The method of claim 11 further comprising adding a septum to said upper fitment member wherein said septum has a thickness substantially greater than the thickness of the wall of the flexible container and the septum is in axial alignment with said upper fitment fluid opening.

17. A method of increasing the shelf life of a fluid material packaged in a flexible bag, said method comprising:
    obtaining a fitment made of a material with a low gas permeability, said fitment having a lower fitment member with a top surface and a fluid conducting opening in said top surface, an upper fitment member having an upper fitment bottom surface with an upper fitment fluid opening, said fluid conducting opening and said upper fitment fluid opening defining a fluid passageway;
    positioning said top surface of said lower fitment member on one side of a flexible film, said flexible film being made of a multi-layered material having at least a barrier layer;
    positioning said upper fitment bottom surface of said upper fitment member on the opposite side of said wall and opposed to said lower fitment member wherein said upper fitment fluid opening is axially aligned with said fluid conducting opening of said lower fitment member;
    compressing said lower fitment member and said upper fitment member together;
    securing said lower fitment member and said upper fitment member together forming a fluid tight seal with said flexible container wherein said flexible film disposed between said fluid conducting opening of said lower fitment member and said upper fitment fluid opening of said upper fitment member remains intact and wherein said flexible film disposed between outermost perimeter edges of each of said lower fitment member and said upper fitment member remains planar; and
    sealing peripheral edges of said flexible film forming a first flexible bag with a fitment thereon.

18. The method of claim 17 further comprising coating at least one of said top surface and said upper fitment bottom surface with a resilient material.

19. The method of claim 17 further comprising inserting at least one gasket between said top surface and said upper fitment bottom surface.

20. The method of claim 17 wherein said obtaining step includes obtaining a fitment having a lower fitment member with one or more posts extending from said top surface and an upper fitment member with at least an equal number of post receiving openings configured to mate with said one or more posts.

21. The method of claim 20 further comprising fusing said one or more posts to said upper fitment member.

22. The method of claim 17 further comprising adding a septum to said fluid passageway wherein said septum has a thickness substantially greater than the thickness of the flexible film.

23. A fitment kit for use with a flexible bag comprising:
    a lower fitment member having a fluid conducting opening in a top surface of said lower fitment member; and
    an upper fitment member having an upper fitment bottom surface and an upper fitment opening, said upper fitment opening forming a fluid conduit with said fluid conducting opening of said lower fitment member, said upper fitment bottom surface and said top surface of said lower fitment member configured to form a mechanical seal between said lower fitment member, a wall of said flexible bag and said upper fitment member wherein said wall of said flexible bag disposed between said fluid conducting opening of said lower fitment member and said fluid conduit of said upper fitment member remains intact and wherein said wall of said flexible bag disposed between outermost perimeter edges of each of said lower fitment member and said upper fitment member remains planar.

24. The kit of claim 23 further comprising a septum having a thickness substantially greater than the thickness of the wall of the flexible bag, the septum configured to be positioned within said fluid conduit.

* * * * *